United States Patent [19]

Bruene

[11] 3,761,625

[45] Sept. 25, 1973

[54] DIGITAL METHOD AND MEANS FOR FREQUENCY SHIFT KEYING

[75] Inventor: Warren B. Bruene, Dallas, Tex.

[73] Assignee: Collins Radio Company, Dallas, Tex.

[22] Filed: Mar. 15, 1972

[21] Appl. No.: 234,961

[52] U.S. Cl. ............... 178/66 A, 325/163, 325/166, 332/9 R, 332/16 R

[51] Int. Cl. ............................................ H04l 27/12

[58] Field of Search ........................ 178/66 R, 66 A; 325/163, 166, 30; 332/9 R, 9 T, 10, 16 R, 16 T

[56] References Cited

UNITED STATES PATENTS

| | | | |
|---|---|---|---|
| 3,518,552 | 6/1970 | Carlow | 325/163 X |
| 3,665,103 | 5/1972 | Watkins | 325/163 X |
| 3,230,454 | 1/1966 | Van Burkleo | 325/166 |
| 2,928,935 | 3/1960 | Murray | 325/166 X |

*Primary Examiner*—Charles E. Atkinson
*Assistant Examiner*—R. Stephen Dildine, Jr.
*Attorney*—Henry K. Woodward et al.

[57] ABSTRACT

Frequency shift keying of input data by means of a variable divider which divides a frequency source by one of two integers depending on the information content of said input data. Source, variable divider, and synchronization means lends itself to large scale integration.

3 Claims, 4 Drawing Figures

DIGITAL METHOD AND MEANS FOR FREQUENCY SHIFT KEYING

This invention relates generally to data communication, and more particularly to data communication employing frequency shift keying.

Disclosed in U. S. Pat. No. 2,977,417 is a frequency shift keying (FSK) communication system for transmitting data employing a minimum shift of frequencies. As explained therein, the minimum shift keyed (MSK) signal may be considered as two separate 180° phase shift keyed signals on exactly the same carrier frequency but 90° apart in phase. Bits from an input data stream are alternated between the two channels so each channel operates at one-half the total bit rate.

In implementing the minimum shift keying, the patent discloses an MSK generator employing two data channels each including a phase modulator for providing the continuous phase shift in response to a "mark" or "space," respectively. Each phase modulator modulates a local carrier frequency by 0° or 180° in accordance with the channel's component information. The local carrier frequencies applied to the respective channels are equal in frequency but one is displaced by 90° from the other. Hence, one channel provides a discrete phase-modulation of the carrier by 0° or 180°, while the other channel provides a discrete phase-modulation by 90° or 270° in response to the component information of the respective channel.

As further recognized in the above-referenced patent, the minimum shift keying may be considered as a special case of frquency shift keying wherein the difference in the two frequencies, or the frequency shift, is one-half of the information data rate. The present invention is directed to a method and means for more efficiently generating an MSK signal.

In accordance with the invention, the means for generating a frequency shift keyed signal for input data at a data frequency rate includes a frequency source at a frequency higher than said data rate. Variable frequency divider means including an input terminal, an output terminal, and a divisor control terminal receives and divides the signal from said frequency source by either of two integer divisors. The control terminal of said frequency divider means receives the input data whereby the divisor of said divider means is selected in response to the data content of said input data, thereby generating a signal at the output of said frequency divider at one of two frequencies. Synchronizing means for synchronizing the input data to the frequency source is included to synchronize the operation. The synchronizing means may comprise storage means for receiving and storing the input data, and a frequency divider control means connected with the frequency source for controlling the release of stored data from said storage means. In another embodiment, the input data is derived from a read only memory and the control means synchronizes the output of the read only memory with the frequency source. The frequency relationships are such that the difference in output signal frequencies from the first divider is equal to one-half of the input data rate.

These and other objects and features of the invention will be more readily apparent from the following detailed description and appended claims, when taken with the drawing, in which:

Figure 1:
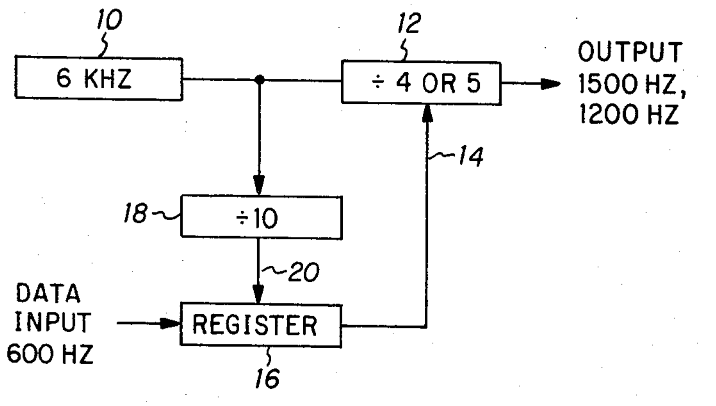
FIG. 1 is a functional block diagram of frequency shift keying means in accordance with the present invention.

Referring now to the drawings, FIG. 1 is a functional block diagram of a frequency shift keying means in accordance with the present invention. Since the frequency shift keying is digital, the means may be advantageously fabricated in one or more semiconductor chips. In this embodiment, a 6 kHz generator 10 is connected to the input of variable divider 12 which may divide an input signal by either the integer 4 or the integer 5. In this embodiment, since the generator is 6 kHz the output of divider 12 will be either 1,500 Hz or 1,200 Hz.

Input data for which a frequency shift keyed signal is desired is provided to the input of register 16. In this illustrative embodiment the data input is at 600 bits per second (b/s). The output of register 16 is connected to control terminal 14 of variable divider 12. The divide ratio of variable divider 12 is controlled by the voltage level at the input 14, i.e., a "mark" voltage level will enable the divide-by-four integer and a "space" voltage level will enable the divide-by-five integer. Clocking for register 16 is provided from the output of generator 10 which is passed through a divide-by-ten divider 18, thereby providing a 600 Hz clock to control terminal 20 of register 16. Divider 18 and register 16 provide synchronization between generator 10 and the input data.

As aforestated, the digitally implemented functional elements of the generator lend themselves to semiconductor integration, and by large scale integration techniques the entire frequency shift keying system may be fabricated in one or more semiconductor chips. The divide-by-four or five function may be in accordance with the counter disclosed in U. S. Pat. No. 3,562,654 with divider 18 resetting the counter at the end of each data input bit, for example.

Figure 2:
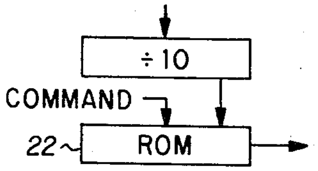
FIG. 2 is a functional block diagram of a portion of frequency shift keying means in accordance with another embodiment of the invention.

FIG. 2 is a functional block diagram of a portion of a keying generator in accordance with another embodiment of the invention. Instead of the 600 b/s data input and register 16 of FIG. 1, a read only memory 22 as illustrated in FIG. 2 may be incorporated in the keying system. Thus, a desired signal such as an identification code may be read from the read only memory periodically or upon receipt of a controlling command signal applied to read only memory 22. The command may be a voltage pulse which enables an otherwise disabled ROM output.

Figure 3:
FIG. 3 is a functional block diagram of an element which may be included with the frequency shift keying means of FIG. 1.

The square wave voltage generated at the output of variable divider 12 includes odd harmonics of the fundamental output frequencies. To eliminate these harmonics a low pass filter 24 as shown in FIG. 3 may be connected to the output of variable divider 12, thereby minimizing interference with other unrelated signals.

Figure 4:
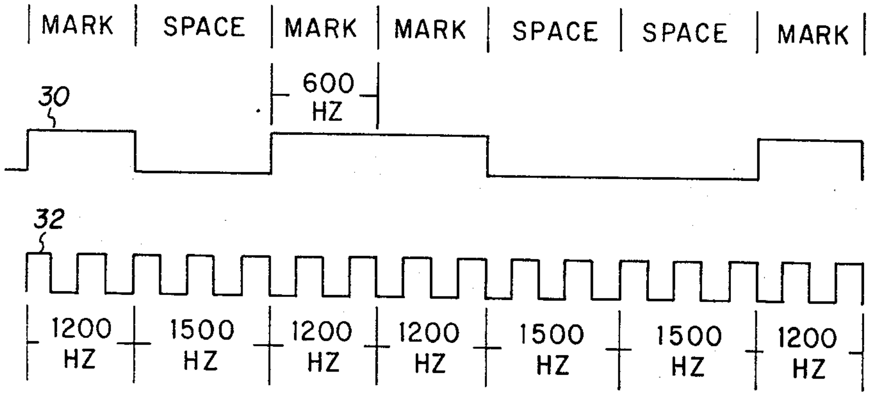
FIG. 4 is waveforms of data input and a frequency shift keyed signal generated by the means of FIG. 1.

Operation of the generator is illustrated in the data input and frequency shift keyed output signals illustrated in FIG. 4. The data input wave 30 comprises two voltage levels at 600 Hz frequency bit rate with the higher voltage level designating a "mark" and the lower voltage level designating a "space". It will be noted in the frequency shift keyed signal 32 that the "mark" voltage level enables the divide-by-five integer of variable divider 12 and a 1,200 Hz wave is generated at the output of divider 12 in the time frame corresponding to the first mark of wave 30. It will be appreciated that the corresponding time frames of wave 32 may be offset from the time frames of wave 30 due to the delay interjected in the system by synchronizing register 16. The first space data input enables the divide-by-four integer of variable divider 12 and output signal 32 is 1,500 Hz during the corresponding time period. Accordingly, a continuous output signal 32 of either 1,200 Hz or 1,500 Hz is generated in response to the mark and space input data. Further, it will be noted that the 1,200 Hz and 1,500 Hz signal increments fit within each time frame of the data input in either two complete cycles or two and one-half complete cycles, respectively. This is in accordance with the MSK theory wherein the frequency differential between the two output signal frequencies, 300 Hz in this embodiment, is equal to one-half the data input rate, 600 b/s in this embodiment.

Thus, it is seen that a simple and economical frequency generator is provided which is compatible with minimum shift keying techniques. While the invention has been described with reference to specific frequencies and divide ratios, the descrption is illustrative and is not to be construed as limiting the invention. For example, using a 9 kHz clock frequency a variable divider of 5 and 6 would obtain output frequencies of 1,500 Hz and 1,800 Hz which is compatible with a 600 Hz data input. In another embodiment with a 200 bit per second input record a 319.8 kHz clock may be used with a variable divider of 156 or 164 to obtain a minimum shift keyed signal output centered on 2,000 Hz.

Various other modifications and changes may occur to those skilled in the art without departing from the spirit and scope of the invention as defined by the appended claims.

I claim:

1. Means for generating a frequency shift keyed signal from input data at a bit rate which is a submultiple of a frequency source comprising:

register means for receiving said input data and having an input terminal, an output terminal, and a control terminal;

variable frequency divider means for dividing said source frequency by either of two integer divisors and including an input terminal, an output terminal, and a divisor control terminal;

means connecting said frequency source to the input of said divider means;

a fixed frequency divider for receiving signals from said frequency source and providing control signals to said control terminal of said register means at said data rate whereby said register output is synchronized with said frequency source, and means connecting the output of said register means to said divisor control whereby the divisor of said variable divider means is selected in response to the data content of said input data, thereby generating a signal at said variable frequency divider output at one of two frequencies.

2. Means for generating a frequency shift keyed signal as defined by claim 1 wherein the difference in frequency of said two frequencies at the output of said variable frequency divider is equal to one-half said input data rate.

3. Means for generating a frequency shift keyed signal as defined by claim 2 and further including a read only memory for generating said input data.

* * * * *